| (12) | United States Patent<br>Otomo et al. | (10) Patent No.: US 11,110,796 B2<br>(45) Date of Patent: Sep. 7, 2021 |
|---|---|---|

(54) METER DEVICE AND METER UNIT PROVIDED WITH METER DEVICE REFLECTING VISIBLE RAYS TO POINTER AND OUTPUTTING INFRARED RAYS FROM POINTER

(71) Applicant: Yazaki Corporation, Tokyo (JP)

(72) Inventors: Kentaro Otomo, Susono (JP); Yukio Suzuki, Susono (JP)

(73) Assignee: Yazaki Corporation, Tokyo (JP)

( * ) Notice: Subject to any disclaimer, the term of this patent is extended or adjusted under 35 U.S.C. 154(b) by 332 days.

(21) Appl. No.: 16/199,735

(22) Filed: Nov. 26, 2018

(65) Prior Publication Data

US 2019/0160945 A1 May 30, 2019

(30) Foreign Application Priority Data

Nov. 27, 2017 (JP) .............................. JP2017-227194

(51) Int. Cl.
*B60K 35/00* (2006.01)
*B60K 37/02* (2006.01)
*G01D 13/00* (2006.01)

(52) U.S. Cl.
CPC .............. *B60K 35/00* (2013.01); *B60K 37/02* (2013.01); *G01D 13/00* (2013.01); *B60K 2370/16* (2019.05); *B60K 2370/21* (2019.05); *B60K 2370/33* (2019.05); *B60K 2370/336* (2019.05); *B60K 2370/50* (2019.05); *B60K 2370/6992* (2019.05); *B60K 2370/73* (2019.05)

(58) Field of Classification Search
CPC ................... G01D 13/00; B60K 37/02; B60K 2370/6992; B60K 2370/336; B60K 2370/21; B60Q 3/10; B60Q 3/12; B60Q 3/14
See application file for complete search history.

(56) References Cited

U.S. PATENT DOCUMENTS

| 6,499,852 | B1* | 12/2002 | Kino ...................... | B60K 37/02<br>362/23.13 |
|---|---|---|---|---|
| 6,741,184 | B1* | 5/2004 | Miller .................... | G01D 13/26<br>116/288 |
| 6,820,990 | B2* | 11/2004 | Ewers .................... | G01D 11/28<br>362/23.08 |
| 6,955,438 | B2* | 10/2005 | Ishii ....................... | G01D 11/28<br>362/23.2 |
| 7,207,117 | B1* | 4/2007 | Cook ..................... | G01D 11/28<br>116/286 |

(Continued)

FOREIGN PATENT DOCUMENTS

| GB | 2567453 A | * | 4/2019 | ............. B60K 37/02 |
|---|---|---|---|---|
| JP | 2014-031140 A | | 2/2014 | |
| WO | 2019/072585 A1 | | 4/2019 | |

*Primary Examiner* — Natalie Huls
(74) *Attorney, Agent, or Firm* — Banner & Witcoff, Ltd.

(57) ABSTRACT

A meter device includes a rotation shaft, a pointer provided in an end part of the rotation shaft and rotating integrally with the rotation shaft, an illumination light source which outputs visible rays to the pointer, a light source of infrared rays which is arranged in parallel to the illumination light source and outputs the infrared rays to the pointer, and a reflection part provided in the pointer to substantially reflect the visible rays into the pointer and to substantially pass and output the infrared rays from a central part of rotation of the pointer.

6 Claims, 8 Drawing Sheets

(56) References Cited

U.S. PATENT DOCUMENTS

| | | | | |
|---|---|---|---|---|
| 7,724,129 | B2* | 5/2010 | Altamonte | G01P 1/08 |
| | | | | 340/461 |
| 7,758,195 | B2* | 7/2010 | Feit | G01D 11/28 |
| | | | | 362/23.15 |
| 9,140,589 | B2* | 9/2015 | Bravo | G01D 13/265 |
| 9,739,646 | B2* | 8/2017 | Suess | G01D 11/28 |
| 2002/0135994 | A1* | 9/2002 | Ikarashi | G01D 13/28 |
| | | | | 362/23.2 |
| 2009/0272313 | A1* | 11/2009 | Ballard | G01D 11/28 |
| | | | | 116/28 R |
| 2010/0073584 | A1* | 3/2010 | Harbach | G08B 21/06 |
| | | | | 349/1 |
| 2019/0100219 | A1* | 4/2019 | Jo | G06K 9/00845 |
| 2019/0124239 | A1* | 4/2019 | Otomo | H04N 5/2256 |
| 2019/0310114 | A1* | 10/2019 | Giusti | B60K 37/02 |
| 2020/0110950 | A1* | 4/2020 | Boron | G06K 9/20 |
| 2020/0139815 | A1* | 5/2020 | Hisatsugu | B60Q 1/2696 |

* cited by examiner

METER DEVICE AND METER UNIT PROVIDED WITH METER DEVICE REFLECTING VISIBLE RAYS TO POINTER AND OUTPUTTING INFRARED RAYS FROM POINTER

CROSS REFERENCE TO RELATED APPLICATIONS

This application claims priority from Japanese Patent Application No. 2017-227194 filed on Nov. 27, 2017, the entire contents of which are incorporated herein by reference.

BACKGROUND OF THE INVENTION

Field of the Invention

The present invention relates to a meter device and a meter unit provided with the meter device.

Description of Related Art

For instance, Patent Literature 1 discloses a technique that provides a "display device" including an image pick-up element which does not harm a design property or a fine appearance.

Further, as disclosed in the Patent Literature 1, in a vehicle on which a driver monitor system is mounted, a camera unit is installed in a rear part of a steering seen from a driver side to pick up an image of the eye or a state of an eyelid of the driver by the camera unit and detect a doze of the driver from picked up image data. In front of the driver, a meter panel on which meters such as a speed meter are arranged is installed. To a lower part of the meter panel, an exclusive camera unit is attached. In the camera unit, an image pick-up element and a plurality of LED light sources which output infrared rays to assuredly pick up the image of the face of the driver even at night are accommodated.

[Patent Literature 1] JP-A-2014-31140

According to a related art, when a LED which outputs an infrared ray is provided in a meter panel on which various kinds of meters or indicators are arranged, the meters or the indicators are hardly arranged with a good balance in a restricted space of the meter panel to harm a design property.

Further, the LED which outputs the infrared rays is arranged so as to apply the infrared rays (including near infrared radiations) to a face of a driver over a steering and independently emits lights. Accordingly, there is a fear that the LED for applying infrared rays which independently emits lights in the meter panel may come into sight of the driver to give uneasiness to the driver.

SUMMARY

One or more embodiments provide a meter device and a meter unit provided with the meter device which do not give uneasiness to a driver by irradiated lights and can be installed in a restricted space and assure a good design property.

In an aspect (1), one or more embodiments provide a meter device including a rotation shaft, a pointer provided in an end part of the rotation shaft and rotating integrally with the rotation shaft, an illumination light source which outputs visible rays to the pointer, a light source of infrared rays which is arranged in parallel to the illumination light source and outputs the infrared rays to the pointer, and a reflection part provided in the pointer to substantially reflect the visible rays into the pointer and to substantially pass and output the infrared rays from a central part of rotation of the pointer.

In an aspect (2), the illumination light source and the light source of the infrared rays are arranged, opposing to an end face of a base end part side of the rotation shaft. The visible rays and the infrared rays pass through the rotation shaft and reach the reflection part.

In an aspect (3), the meter device further comprises a tubular light guide member into which the rotation shaft is inserted. The illumination light source and the light source of infrared rays are arranged, opposing to an end face of a base end part side of the light guide member. The visible rays and the infrared rays pass through the light guide member and reach the reflection part.

In an aspect (4), the pointer includes a light guide part protruding toward the illumination light source and the light source of infrared rays and having light input surfaces which allow the visible rays and the infrared rays to be incident.

In an aspect (5), a diffusion lens which diffuses and outputs the infrared rays is provided with the pointer.

In an aspect (6), one or more embodiments provide a meter unit including the meter device according to the aspect (1), a camera which picks up an image of an irradiated member which is irradiated with the infrared rays, and a meter panel on which the meter device and the camera are installed.

According to the aspect (1), since a pointer is allowed to emit lights and to be illuminated by visible rays, the visibility of the pointer can be enhanced. Further, since infrared rays are outputted from the pointer, for instance, the infrared rays are applied to the face of the driver to photograph the face of the driver by a camera, so that the orientation of the face or a direction of the line of sight of the driver can be satisfactorily detected. At this time, since the applied infrared rays are outputted from a central part of a rotation of the pointer illuminated by the visible rays, a fear can be more suppressed that uneasiness may be possibly given to the driver by the infrared rays than in a structure in which infrared rays are applied from a separately provided light source of the infrared rays. Further, the meter device can be easily installed in a restricted space, so that a degree of freedom in design can be enhanced and a design property can be improved.

According to the aspect (2), the visible rays and the infrared rays from the illumination light source and the light source of the infrared rays can be effectively guided to a reflection part of the pointer through a rotation shaft.

According to the aspect (3), the visible rays and the infrared rays from the illumination light source and the light source of the infrared rays can be effectively guided to the reflection part of the pointer through a light guide member.

According to the aspect (4), the visible rays and the infrared rays from the illumination light source and the light source of the infrared rays can be made to be incident from a light input surface of a light guide part provided in the pointer and effectively guided to the reflection part of the pointer through the light guide part.

According to the aspect (5), since the outgoing infrared rays are diffused by a diffusion lens and outputted, the infrared rays can be evenly applied to, for instance, the face of the driver. Thus, the orientation of the face or the direction of the line of sight of the driver can be effectively detected by the camera.

According to the aspect (6), the infrared rays outputted from the meter device can be applied to an irradiated member such as the face of the driver to photograph the face of the driver by the camera and effectively detect the orientation of the face or the direction of the line of sight of the driver, so that the meter unit can be used for a safe driving. At this time, since the infrared rays are outputted from a central part of a rotation of a pointer which emits light and is illuminated, an uneasiness of the driver due to the infrared rays can be suppressed. Further, a degree of freedom in design can be enhanced and the meter device and the camera can be installed with a good balance in a restricted space of a meter panel to ensure a good design property.

According to one or more embodiments, a meter device and a meter unit provided with the meter device can be provided which do not give uneasiness to a driver by irradiated lights and can be installed in a restricted space and assure a good design property.

The present invention is briefly described above. Further, when modes for carrying out the invention which will be described below is read by referring to the attached drawings, a detail of the present invention will be more clarified.

DETAILED DESCRIPTION

Figure 1:
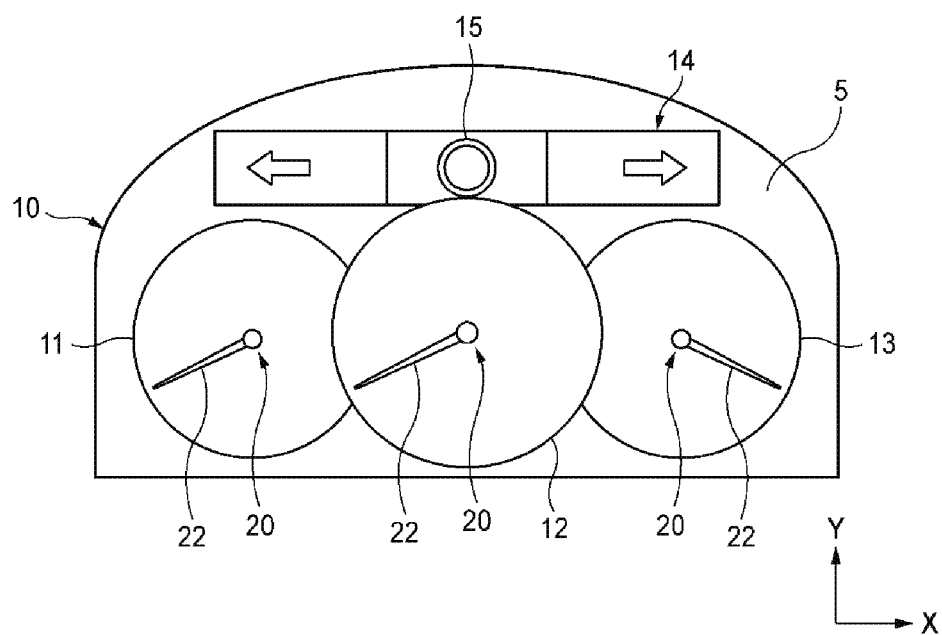
FIG. 1 is a schematic front view of a meter unit according to an exemplary embodiment.

Specific exemplary embodiments will be described below by referring to the drawings.
<Structure Example of Meter Unit>

Figure 2:
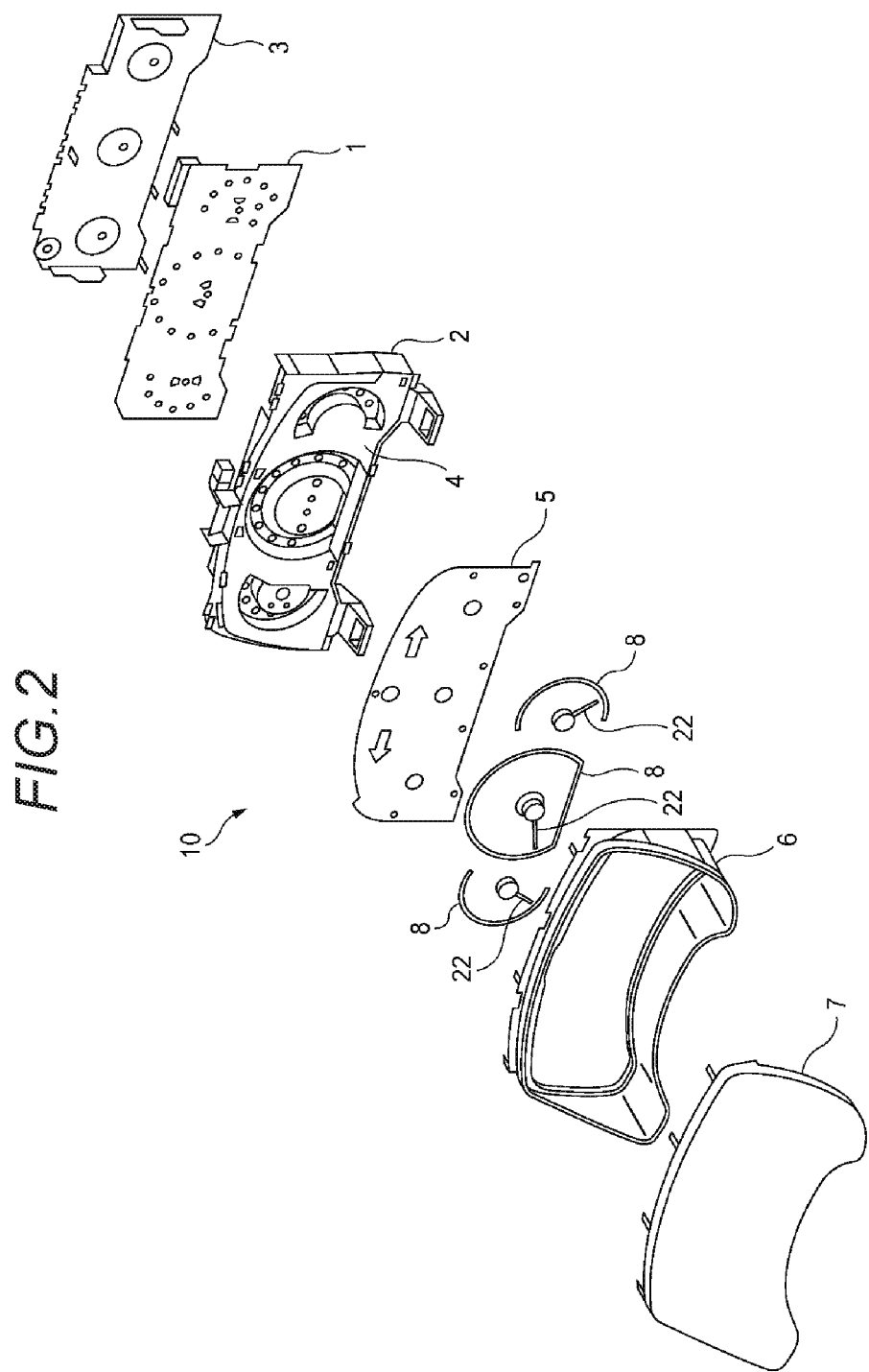
FIG. 2 is an exploded perspective view of the meter unit according to the exemplary embodiment.

Initially, a meter unit will be described below. FIG. 1 is a schematic front view of a meter unit according to an exemplary embodiment of the present invention. FIG. 2 is an exploded perspective view of the meter unit according to the exemplary embodiment of the present invention.

As shown in FIG. 1 and FIG. 2, the meter unit 10 according to the present exemplary embodiment includes, as main components, a left side meter display part 11, a central meter display part 12, a right side meter display part 13, an indicator display part 14 and a camera 15. The meter unit 10 is mounted on a vehicle and arranged in a front position of a driver who sits on a driver's seat of the vehicle under such a state as to be easily visually recognized by the driver. Directions of an X-axis and a Y-axis in FIG. 1 respectively correspond to a rightward and leftward direction and an upward and downward direction of the vehicle.

The meter unit 10 includes a meter case 2 in which a circuit board 1 having a motor or the like mounted is accommodated. The meter case 2 has a back surface covered with a cover 3. A front surface of the meter case 2 is formed as a meter panel 4. To the meter panel 4, a character plate 5, an inside plate 6 and a display glass 7 are attached in order. To a front side of the character plate 5, pointers 22 forming the left side meter display part 11, the central meter display part 12 and the right side meter display part 13 are attached.

The left side meter display part 11, the central meter display part 12 and the right side meter display part 13 are used as, for instance, an engine revolution counter (a tachometer), a speed meter or a fuel gauge.

The left side meter display part 11, the central meter display part 12 and the right side meter display part 13 are respectively provided with meter devices 20. The meter devices 20 are provided with the pointers 22. The pointers 22 are arranged in the front side of the character plate 5. On the character plate 5, characters, numeric characters, signs and scales are provided. Further, decorative members 8 such as decorative rings are attached.

In the left side meter display part 11, the central meter display part 12 and the right side meter display part 13, the pointers 22 of the meter devices 20 rotate so that the pointers 22 indicate the characters, the numeric characters, the signs and the scales on the character plate 5.

The indicator display part 14 is arranged as an area of an elongated rectangular form in an upper side of the left side meter display part 11, the central meter display part 12 and the right side meter display part 13 in the meter panel 4. The indicator display part 14 is an area ordinarily used to display an indicator. As a typical example, arrow shaped indicators which respectively show operation states of right and left direction indicators of the vehicle are arranged in the indicator display part 14.

In the meter panel 4, a display part (an illustration is omitted) is provided which is formed with displays showing, for instance, a speed change state of an automatic speed change gear, an on-off state of a parking brake, a lighting state of a head light, a lighting state of a vehicle width lamp or a plurality of lamps.

In an example shown in FIG. 1, the camera 15 is arranged at a position in the same area as that of the indicator display part 14 seen from the visual point of the driver. The camera 15 is arranged in such a way that a photographing direction is directed toward the face of the driver under a state that a photographing range is adjusted so as to detect an orientation of the face or the direction of the line of sight of the driver. The camera 15 has a detection property which makes it possible to photograph infrared rays as lights of a wave length of an infrared ray (IR) area. The camera 15 is provided on a substrate of the indicator display part 14 arranged inside the meter panel 4 or a back surface of the meter panel 4 so as not to be noticed by the driver. In the camera 15, a visible ray cutting filter is preferably installed in a front surface to reduce an influence of disturbance lights.

In the meter unit 10 having the above-described structure, at least one of the meter devices 20 of the left side meter display part 11, the central meter display part 12 and the right side meter display part 13 is provided with an infrared ray applying function for applying the infrared rays (including near infrared radiations) as the lights of the wave length of the infrared ray (IR) area toward the direction of the face of the driver.
<Structure Example of Meter Device>

Now, the meter device 20 having the infrared ray applying function will be described below.

Figure 3:
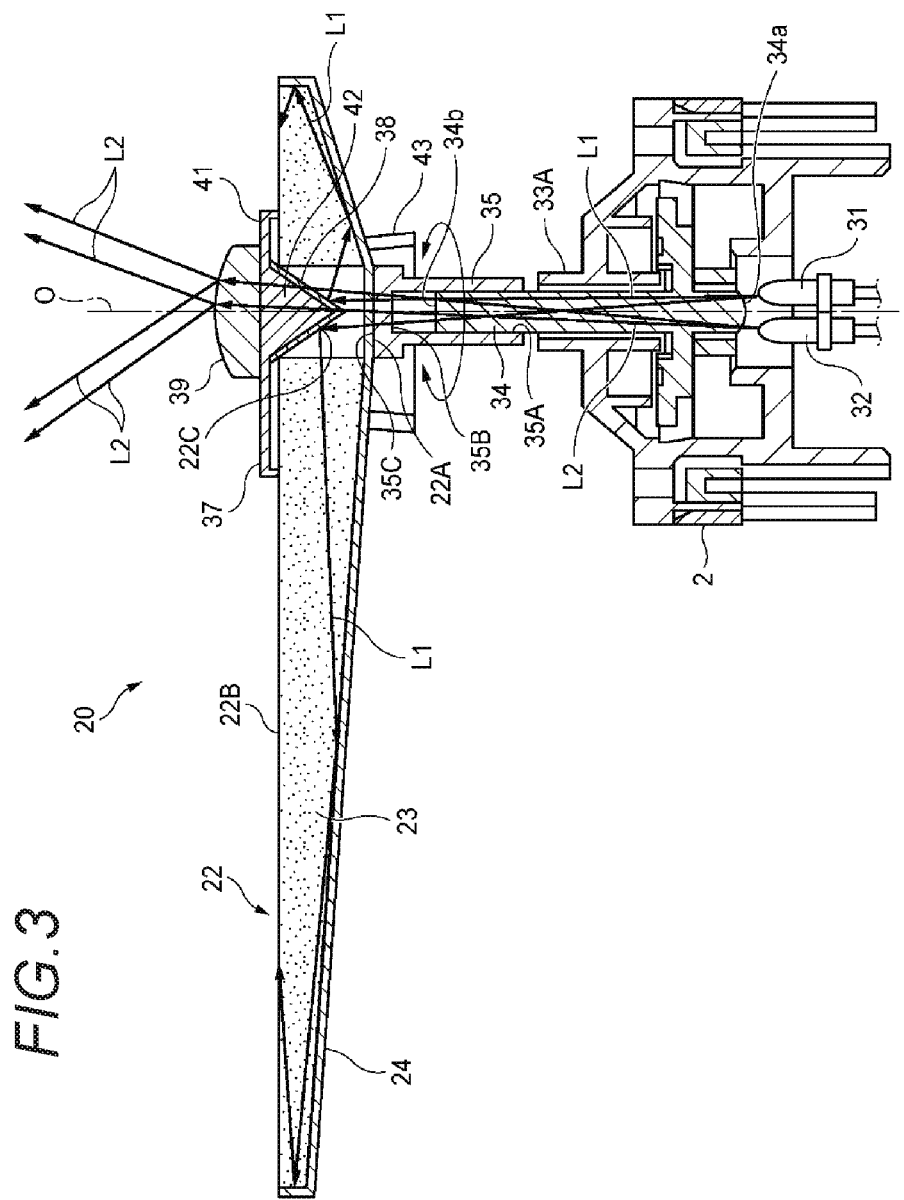
FIG. 3 is a sectional view of a meter device according to an exemplary embodiment.
Figure 4:
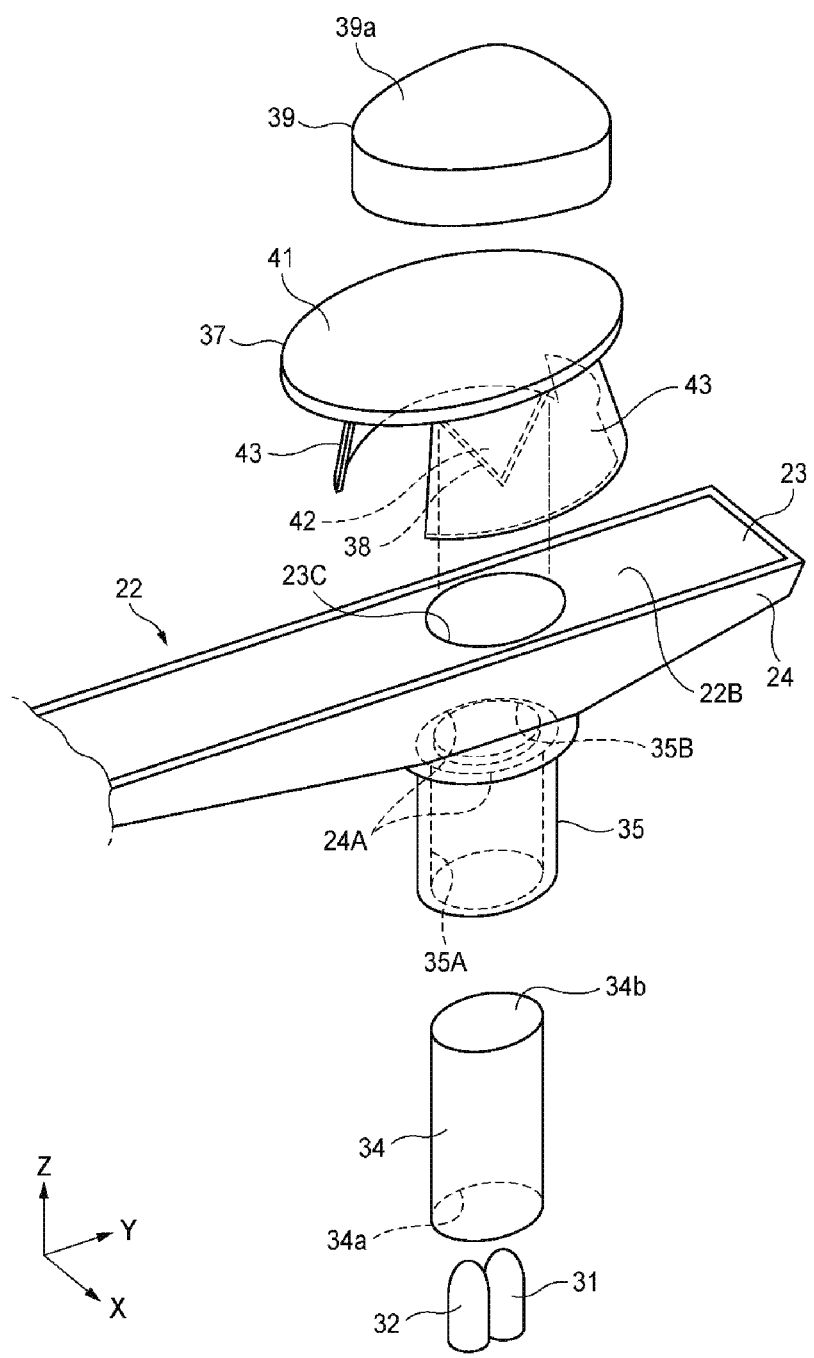
FIG. 4 is a partly exploded perspective view of the meter device according to the exemplary embodiment.

FIG. 3 is a sectional view of the meter device according to the exemplary embodiment of the present invention. FIG. 4 is a partly exploded perspective view of the meter device according to the exemplary embodiment of the present invention.

As shown in FIG. 3 and FIG. 4, the meter device 20 having the infrared ray applying function includes an illumination light source 31, a light source 32 of infrared rays, a rotation shaft 34 to which a driving force of a motor not shown in the drawing and accommodated in the meter case 2 is transmitted to rotate, a pointer 22 having a connection part 35 provided integrally which is fitted to an end part of the rotation shaft 34, a cap 37 with which a base part of the pointer 22 is covered, a reflection part 38 formed in the cap 37 and a diffusion lens 39 attached to the cap 37.

The illumination light source 31 and the light source 32 for infrared rays are formed with, for instance, a light emitting diode (LED: Light Emitting Diode) and arranged in parallel with each other. The illumination light source 31 outputs visible rays L1 as illumination lights. The light source 32 of infrared rays outputs infrared rays L2. The illumination light source 31 and the light source 32 of the infrared rays respectively have their light emitting parts opposed to an end face 34*a* in a base end part side of the rotation shaft 34. The visible rays L1 and the infrared rays L2 outputted from the illumination light source 31 and the light source 32 of the infrared rays are made to be incident from the end face 34*a* in the base end part side of the rotation shaft 34.

As the illumination light source 31 and the light source 32 of the infrared rays, a light source which has no directional dependence of a phase angle in output lights and has an equal output property is preferably used. Namely, the illumination light source 31 and the light source 32 of the infrared rays preferably have a light quantity distribution characteristic in which a substantially equal quantity of light is outputted to the rotation shaft 34 over an entire periphery of 360° with respect to a direction of a horizontal plane (an X-Y plane). As the illumination light source 31 and the light source 32 of the infrared rays, a light source is not limited especially to the LED, and, is preferably a small point light source which has a low consumed electric power.

In the meter case 2, the motor, an intermediate gear and an output gear which are not shown in the drawing are provided as well as the rotation shaft 34. The rotation shaft 34 is rotated by the driving force transmitted from the motor, formed with a light transmitting material, and substantially in a solid circular shape in section. The motor serves to rotate the pointer 22, decelerates and rotates the rotation shaft 34 through the intermediate gear and the output gear. Thus, the pointer 22 is assuredly rotated along the surface of the character plate to indicate various kinds of necessary information. The rotation shaft 34 has the base end part supported by a bearing 33A provided in the meter case 2 so as to freely rotate. To the end face 34*a* of the base end part side of the rotation shaft 34, the illumination light source 31 and the light source 32 of the infrared rays arranged in parallel are opposed.

As shown in FIG. 3, the end part side of the rotation shaft 34 is fitted to a tubular hole 35A of the connection part 35 formed integrally with the pointer 22. The pointer 22 having the connection part 35 provided integrally is fixed to the rotation shaft 34 by fitting the rotation shaft 34 to the tubular hole 35A of the connection part 35. In such a way, the connection part 35 is attached integrally to the rotation shaft 34 which is rotated by the rotating and driving force of the motor and rotated together with the rotation shaft 34.

The end face 34*a* of the rotation shaft 34 is provided so as to be located just above the illumination light source 31 and the light source 32 of the infrared rays. When the visible rays L1 and the infrared rays L2 from the illumination light source 31 and the light source 32 of the infrared rays are incident on the rotation shaft 34, the visible rays L1 and the infrared rays L2 are guided into the rotation shaft 34 and propagated to the end part. Namely, in the rotation shaft 34, most of the visible rays L1 and the infrared rays L2 is totally reflected in a boundary to an external field (air) in an outer peripheral surface and guided to the end part.

The connection part 35 is formed with a material good in its light transmissibility and integrally extended downward from a base part as a center of rotation of the pointer 22 through which an axis O passes. A top surface 35B corresponding to a bottom of the tubular hole 35A opened in a lower end of the connection part 35 has a flat shape parallel to a horizontal (X-Y) direction in order to restrain the visible rays L1 and the infrared rays L2 transmitted in the rotation shaft 34 and outputted from an end face 34*b* of an end part side from leaking out as much as possible. Further, an upper surface 35C as an opposite surface of the top surface 35B of the connection part 35 in the present exemplary embodiment similarly has a flat shape.

The pointer 22 rotates along the surface of the character plate 5 together with the rotation shaft 34 through the connection part 35 to indicate the numeric characters or the scales provided in the character plate 5. The pointer 22 has such an illumination structure as to restrain the lights guided to an inner part from being directly incident on the eye of a viewer and stimulating the eye as much as possible and, at the same time, represent a unique outward appearance, a sense of higher grade or a sense of novelty.

The pointer 22 has a main body part 23 formed with a suitable material having a non-transmissibility and a semi-transmissibility. The main body part 23 is formed in an inverted equal leg trapezoidal shape in section in order to output indirect illumination lights toward a surface as an upper surface 22B visually recognized by the viewer and emit lights as much as possible. In the main body part 23, reflection parts 24 are provided on three surfaces excluding the surface as the upper surface 22B. The reflection parts 24 are formed with an ordinary metal material, for instance, an Al or Ag vapor deposited material, a material painted or plated with Al or Ag, a dielectric multi-layer film vapor deposited material, a material which is previously formed with a prescribed light shield material or a material to which a hot stamp is applied. In the main body part 23 of the pointer 22, a hole part 23C passing through in a direction of thickness (Z) is bored at a center of rotation of the pointer 22. Further, in the reflection part 24, a through hole 24A which communicates with the hole part 23C is formed at the central part of rotation of the pointer 22.

The cap 37 is formed with a material having transmissibility or a semi-transmissibility. The cap 37 is provided on the center of rotation of the pointer 22, namely, aligned with an axis O passing through the center of the hole part 23C and provided on an upper part thereof. The cap 37 has a disk part 41, a reflection protrusion 42 and a pair of engaging pieces 43. The reflection protrusion 42 and the engaging pieces 43 are formed in an attaching side to the pointer 22.

The reflection protrusion 42 is formed with a conical protrusion and a reflection part 38 is provided on a surface thereof. The reflection part 38 is formed with a dielectric multi-layer film mirror having such a function as to reflect the visible rays L1 and transmit the infrared rays L2 like, for instance, a cold mirror. The engaging pieces 43 are arranged to be opposed to each other so as to surround the reflection protrusion 42. The cap 37 is attached to the pointer 22 so as to fit the pointer 22 between the engaging pieces 43, so that the engaging pieces 43 engage both the side parts of the pointer 22. Thus, the cap 37 is attached to the pointer 22. The reflection protrusion 42 having the reflection part 38 is arranged in the hole part 23C of the main body part 23 by attaching the cap 37 to the pointer 22. As the reflection protrusion 42 having the reflection part 38, a pyramid shape such as a square pyramid or a polygonal pyramid which protrudes in a pointed form toward a lower surface 22A of the pointer 22 may be used as well as the conical shape.

The diffusion lens 39 is fixed to an opposite side to the reflection protrusion 42 in the disk part 41 of the cap 37. The diffusion lens 39 is fixed to the disk part 41 by an adhesive material good in its light transmissibility. In the diffusion lens 39, an opposite side to the fixing side to the disk part 41 is formed as a diffusion surface 39a swelling in a spherical form. The diffusion lens 39 is formed with a suitable material having transmissibility. On the diffusion surface 39a of the diffusion lens 39, for instance, fine irregularities are formed on a surface. The diffusion surface 39a diffuses outputted lights.

Now, an operation of the meter device 20 and the meter unit 10 according to the present exemplary embodiment will be described below. As the meter device 20, a case that the speed meter of the vehicle is used is exemplified and explained.

When the vehicle begins to move and a speed is detected by the speed sensor not shown in the drawing, the motor provided in the meter case 2 starts to rotate and drive in accordance with a sensor signal outputted according to a present speed. Thus, the pointer 22 is rotated by a prescribed angle to indicate specific scales or numeric characters formed on the character plate 5.

Namely, the rotation shaft 34 rotates at an angular velocity meeting the speed by a driving force of the motor not shown in the drawing. Thus, the pointer 22 fitted to the end part of the rotation shaft 34 is rotated to indicate the specific scales or numeric characters on the character plate 5 by an end of the pointer 22. In such a way, the present speed can be analog displayed and given to the driver or the like.

In the meter device 20 which carries out such a speed display, the visible rays L1 outputted from the illumination light source 31 and the infrared rays L2 outputted from the light source 32 of the infrared rays are totally reflected in the boundary to the external field in the outer peripheral surface in the rotation shaft 34 and propagated upward. Then, when the visible rays L1 and the infrared rays L2 reach to the end part of the rotation shaft 34, the visible rays L1 and the infrared rays L2 are outputted from the end face 34b in the end part side of the rotation shaft 34 to advance to an upper hole 22C of the pointer 22 through the connection part 35.

The visible rays L1 are reflected on the surface of the reflection part 38 of the reflection protrusion 42 having a conical shape which is inserted into the hole part 23C. Most of the visible rays whose advancing optical path is deflected substantially by 90° is incident on the main body part 23 of the pointer 22, gradually absorbed or attenuated, advances to the end of the main body part 23, emits lights and makes an illumination. Thus, the pointer 22 can indirectly emit lights. Since the visible rays L1 are partly reflected on the three surfaces on which the reflection parts 24 are formed while the visible rays L1 advance in the main body part 23, the visible rays L1 are outputted from the surface of the main body part 23 under a state that a luminance is lowered. Accordingly, to the driver who visually recognizes the pointer 22, illumination lights having a high luminance and a strong stimulation do not enter to the eyes, so that a fatigue to the eyes can be suppressed.

The infrared rays L2 pass through the reflection part 38 formed with the cold mirror of the conical reflection protrusion 42 inserted into the hole part 23C. The infrared rays L2 passing through the reflection part 38, pass through the cap 37, are guided to the diffusion lens 39, diffused from the diffusion surface 39a of the diffusion lens 39 and outputted to an outer side. Thus, the face of the driver is equally irradiated with the infrared rays L2 outputted from the meter device 20. Accordingly, the orientation of the face or the direction of the line of sight of the driver can be effectively detected by the camera 15 having a detection property which makes it possible to photograph the lights of the wave length of the infrared ray (IR) area.

Since the infrared rays L2 actually have a prescribed frequency band including a near infrared radiation area, the infrared rays L2 may be visually recognized by the driver. However, since the infrared rays L2 applied to the face of the driver from the meter device 20 of the present exemplary embodiment are partly outputted from the pointer 22 illuminated by the visible rays L1, a fear is suppressed that an uneasiness may be possibly given to the driver by the infrared rays L2.

As described above, according to the meter device 20 of the present exemplary embodiment, since the pointer 22 is allowed to emit lights and to be illuminated by the visible rays L1, the visibility of the pointer 22 can be enhanced. Further, since the infrared rays L2 are outputted from the end side of the rotation shaft 34, the infrared rays L2 can be applied to the face of the driver to photograph the face of the driver by the camera 15 and the orientation of the face or the direction of the line of sight of the driver can be effectively detected by the camera. At this time, since the applied infrared rays L2 are outputted from a central part of the rotation of the rotation shaft 34 with the pointer 22 provided which is illuminated by the visible rays L1, a fear can be more suppressed that an uneasiness may be possibly given to the driver by the infrared rays L2 than in a structure in which the infrared rays are applied from a separately provided light source of the infrared rays. Further, the meter device can be easily installed in a restricted space, so that a degree of freedom in design can be enhanced and a design property can be improved.

Further, according to the structure in which the illumination light source 31 and the light source 32 of the infrared rays are arranged so as to be opposed to the end face 34a of the base end part side of the rotation shaft 34, so that the visible rays L1 and the infrared rays L2 from the illumination light source 31 and the light source 32 of the infrared rays can be effectively guided to the reflection part 38 of the pointer 22 through the rotation shaft 34.

Further, since the outgoing infrared rays L2 are diffused by the diffusion lens 39 and outputted, the infrared rays L2 can be evenly applied to the face of the driver. Thus, the orientation of the face or the direction of the line of sight of the driver can be effectively detected by the camera 15.

According to the meter unit 10 having the meter device 20, the infrared rays outputted from the meter device 20 can be applied to the face of the driver to photograph the face of the driver by the camera 15 and effectively detect the orientation of the face or the direction of the line of sight of the driver, so that the meter unit can be used for a safe driving. Further, a degree of freedom in design can be enhanced and the meter device 20 and the camera 15 can be installed with a good balance in a restricted space of the meter panel 4 to ensure a good design property.

The present invention is not limited to the above-described exemplary embodiments, and may be suitably modified and improved. In addition thereto, materials, forms, dimensions, numbers, arranged positions or the like of the components in the above-described exemplary embodiments are arbitrary and are not limited as long as the present invention can be achieved.

Now, modified examples of the meter device will be described below.

The same component parts as those of the meter device 20 according to the above-described exemplary embodiment are designated by the same reference numerals and an explanation thereof is omitted.

Modified Example 1

Figure 5:
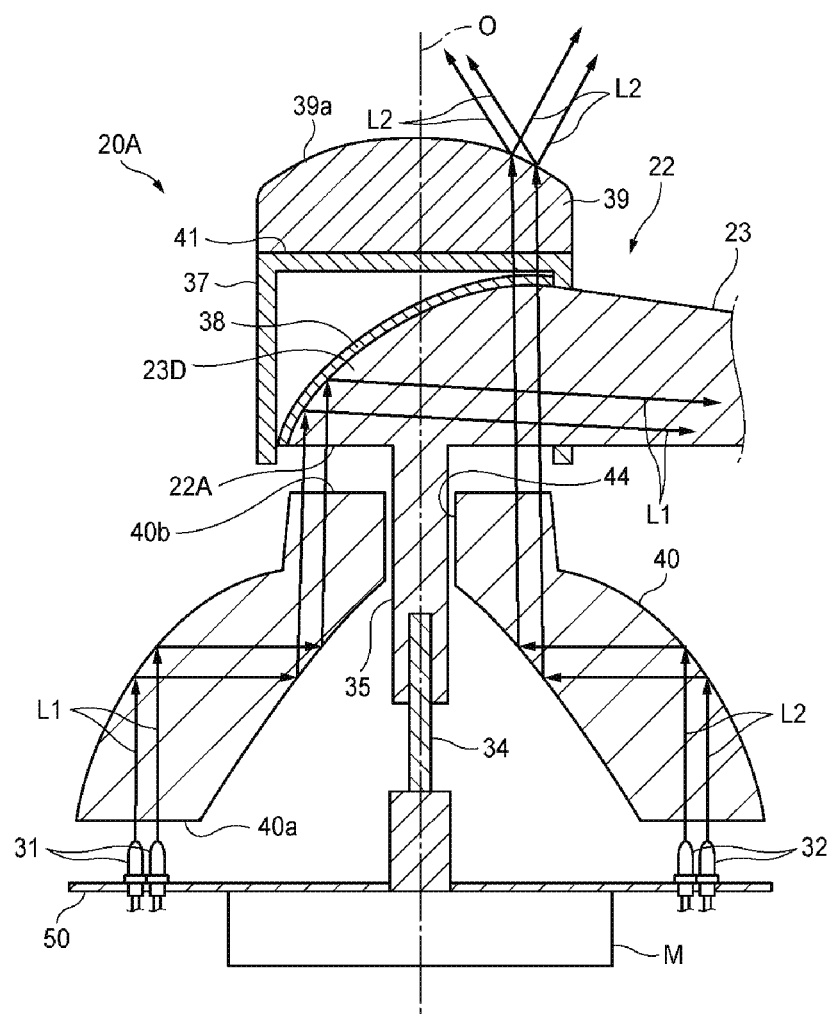
FIG. 5 is a sectional view of a meter device according to a modified example 1.

FIG. 5 is a sectional view of a meter device according to a modified example 1.

As shown in FIG. 5, the meter device 20A according to the modified example 1 is provided with a light guide member 40. The light guide member 40 is formed with a light transmissible resin, for instance, transparent PMMA or transparent PC. The light guide member 40 is formed in a tubular shape having an insert hole 44. The light guide member 40 is formed in the shape swelling upward. Into the insert hole 44 of the light guide member 40, a connection part 35 of a pointer 22 to which a rotation shaft 34 rotated by a motor M provided on a circuit board 1 is fitted is inserted.

In the light guide member 40, an illumination light source 31 and a light source 32 of infrared rays mounted on the circuit board 1 and arranged in parallel to each other are completely opposed to an annular end face 40a formed in a base end part side. Visible rays L1 and infrared rays L2 emitted from the illumination light source 31 and the light source 32 of the infrared rays are incident from the end face 40a of the base end part side of the substantially cylindrical light guide member 40 whose diameter is larger as the diameter comes the nearer to the illumination light source 31 and the light source 32 of the infrared rays. When the visible rays L1 and the infrared rays L2 from the illumination light source 31 and the light source 32 of the infrared rays are incident on the light guide member 40, most of the visible rays L1 and the infrared rays L2 are totally reflected in a boundary part to an external field (air) in a curved outer peripheral surface and a boundary part to an external field (air) in a curved inner peripheral surface of the light guide member 40, converged and guided to an end part. Then, the visible rays L1 and the infrared rays L2 are outputted from an end face 40b of the end part side of the light guide member 40.

In the meter device 20A, a hole part 23C is not provided in a main body part 23 of the pointer 22. Further, an opposite side to the connection part 35 to which the rotation shaft 34 is fitted is formed as a curved part 23D swelling outward. In the pointer 22, on a surface of the curved part 23D of the main body part 23, a reflection part 38 formed with a cold mirror is provided. In the main body part 23, a reflection part 24 is not provided in at least a part opposed to the end face 40b of the end part side of the light guide member 40. Thus, the visible rays L1 and the infrared rays L2 outputted from the end face 40b of the end part side of the light guide member 40 are guided to the main body part 23.

Further, in the meter device 20A, a cap 37 having no reflection protrusion 42 is attached to the main body part 23 of the pointer 22. Thus, in the pointer 22, the curved part 23D of the main body part 23 is covered with the cap 37. To the cap 37, a diffusion lens 39 is attached.

In the meter device 20A according to the modified example having the above-described structure, the visible rays L1 outputted from the illumination light source 31 and the infrared rays L2 outputted from the light source 32 of the infrared rays are incident on the light guide member 40 from the end face 40a of a lower end part side of the light guide member 40, totally reflected in the boundaries to the external fields in the outer peripheral surface and the inner peripheral surface of the light guide member 40 and propagated upward. Then, when the visible rays L1 and the infrared rays L2 reach to the end part of the light guide member 40, the visible rays L1 and the infrared rays L2 are outputted from the end face 40b of the end part side and incident on the main body part 23 of the pointer 22.

The visible rays L1 are reflected on the surface of the reflection part 38 of the curved part 23D of the main body part 23. Most of the visible rays L1 whose advancing optical path is deflected substantially by 90° is gradually absorbed or attenuated and guided to the end of the main body part 23 to emit lights and make an illumination. Thus, the pointer 22 can carry out an indirect light emission.

The infrared rays L2 pass through the reflection part 38 formed with the cold mirror of the curved part 23D. The infrared rays L2 passing through the reflection part 38 pass through the cap 37, are guided to the diffusion lens 39, diffused from a diffusion surface 39a of the diffusion lens 39 and outputted to an outer part. Thus, the face of a driver is equally irradiated with the infrared rays L2 outputted from the meter device 20A. Accordingly, an orientation of the face or a direction of the line of sight of the driver can be effectively detected by a camera 15 having a detection property which makes it possible to photograph the lights of a wave length of an infrared ray (IR) area.

Further, also in the case of the meter device 20A, since the infrared rays L2 applied to the face of the driver are outputted from a part of the pointer 22 illuminated by the visible rays L1, a fear is suppressed that an uneasiness may be possibly given to the driver by the infrared rays L2.

As described above, according to the meter device 20A of the modified example, since the pointer 22 is allowed to emit lights and to be illuminated by the visible rays L1, the visibility of the pointer 22 can be enhanced. Further, since the infrared rays L2 are outputted from the pointer 22, the infrared rays L2 can be applied to the face of the driver to photograph the face of the driver by the camera 15 and the orientation of the face or the direction of the line of sight of the driver can be effectively detected by the camera. At this time, since the applied infrared rays L2 are outputted from a central part of the rotation of the pointer 22 which is illuminated by the visible rays L1, a fear can be more suppressed that an uneasiness may be possibly given to the driver by the infrared rays L2 than in a structure in which the infrared rays are applied from a separately provided light source of the infrared rays. Further, the meter device can be easily installed in a restricted space, so that a degree of freedom in design can be enhanced and a design property can be improved.

Further, in the modified example 1, the illumination light source 31 and the light source 32 of the infrared rays are arranged so as to be opposed to the end face 40a of the base end part side of the light guide member 40. Thus, the visible rays L1 and the infrared rays L2 from the illumination light source 31 and the light source 32 of the infrared rays can be effectively guided to the reflection part 38 of the pointer 22 through the light guide member 40.

Modified Example 2

Figure 6:
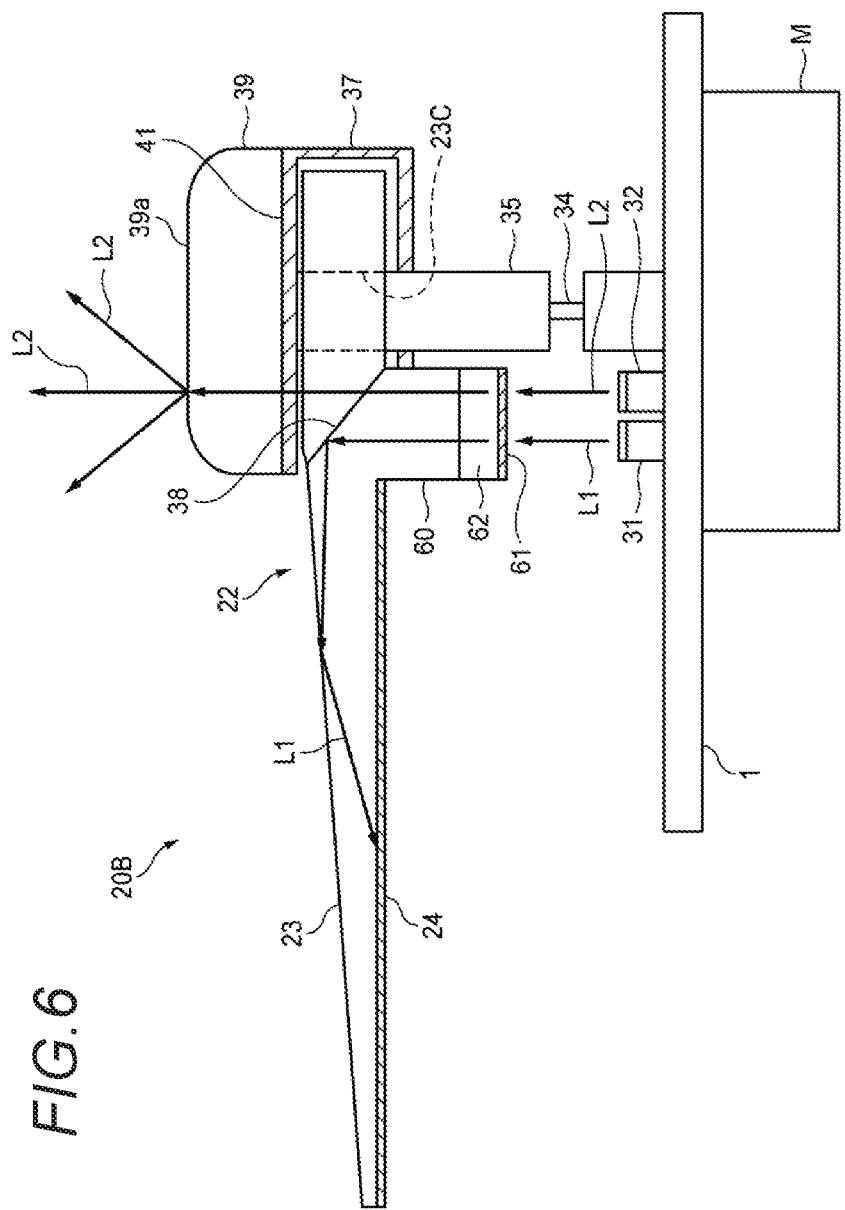
FIG. 6 is a sectional view of a meter device according to a modified example 2.
Figure 7:
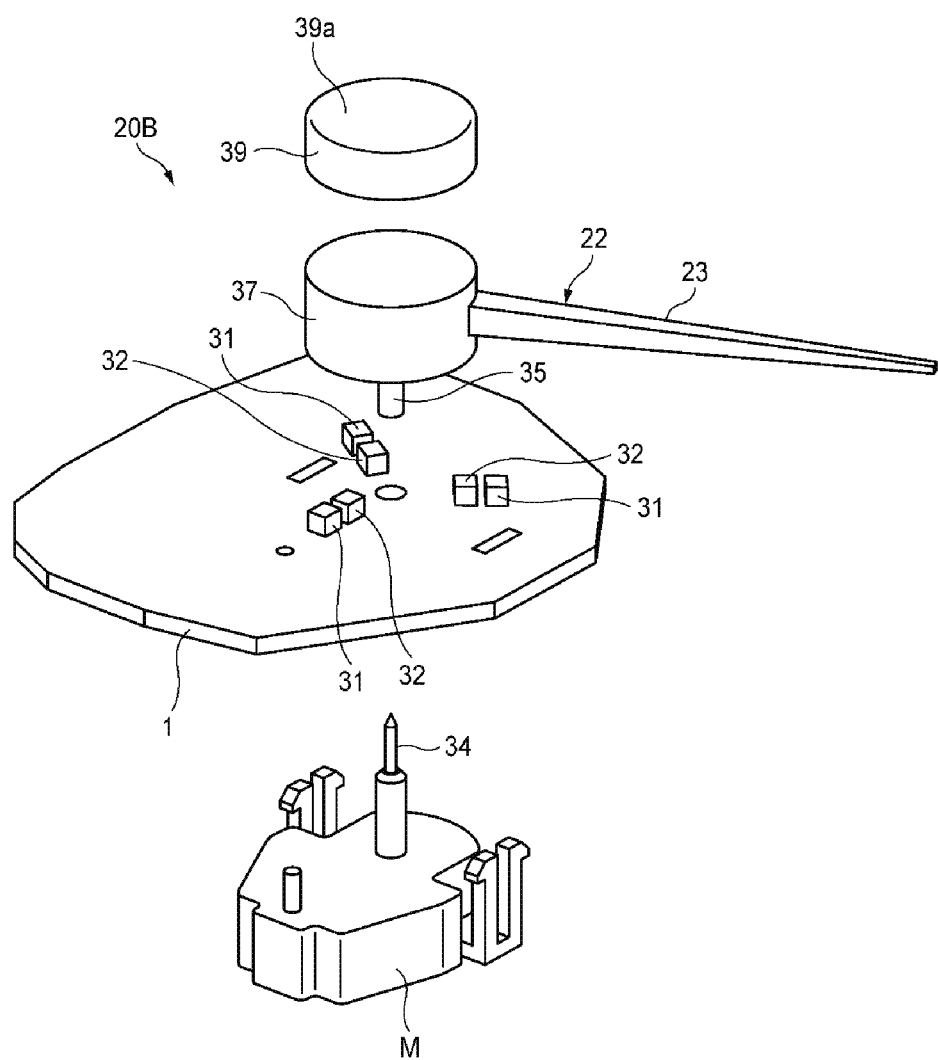
FIG. 7 is a partly exploded perspective view of the meter device according to the modified example 2.
Figure 8:
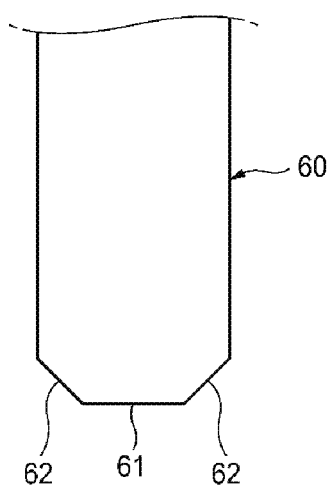
FIG. 8 is a front view of a light guide part provided in a pointer.

FIG. 6 is a sectional view of a meter device according to a modified example 2. FIG. 7 is a partly exploded perspective view of the meter device according to the modified example 2. FIG. 8 is a front view of a light guide part provided in a pointer.

As shown in FIG. 6 and FIG. 7, in the meter device 20B according to the modified example 2, a rotation shaft 34 rotated by a motor M is connected to a connection part 35 provided in a pointer 22. The connection part 35 is fitted to a hole part 23C of a main body part 23 of the pointer 22. Thus, the pointer 22 is rotated by driving the motor M.

In the main body part 23 of the pointer 22, a light guide part 60 protruding toward a circuit board 1 side is integrally formed. The light guide part 60 is formed in an extending direction side of the main body part 23 from the connection part 35 to which the rotation shaft 34 is connected. In the pointer 22, a reflection part 38 formed with a cold mirror is provided in an opposite position to the protruding direction of the light guide part 60.

As shown in FIG. 8, the light guide part 60 has a light input surface 61 formed by a lower end surface and inclined light input surfaces 62 formed by inclined surfaces at both sides of the light input surface 61.

On the circuit board 1, an illumination light source 31 and a light source 32 of infrared rays are mounted which are arranged in parallel to each other. A plurality of pairs (three pairs in this example) of illumination light sources 31 and light sources 32 of the infrared rays are provided at prescribed intervals along a rotating track of the light guide part 60 in the periphery of the rotation shaft 34. Visible rays L1 and infrared rays L2 emitted from the illumination light sources 31 and the light sources 32 of the infrared rays are incident from the light input surface 61 and the inclined light input surfaces 62 of the light guide part 60. When the visible rays L1 and the infrared rays L2 from the illumination light sources 31 and the light sources 32 of the infrared rays are incident on the light guide part 60, most of the visible rays L1 and the infrared rays L2 are totally reflected in boundary parts to external fields (air) in an outer peripheral surface and an inner peripheral surface of the light guide part 60 and converged and advance upward.

In the meter device 20B, a cap 37 having no reflection protrusion part 42 is attached to the main body part 23 of the pointer 22. To the cap 37, a diffusion lens 39 is also attached to a disk part 41 thereof.

In the meter device 20B according to the modified example 2 having the above-described structure, the visible rays L1 outputted from the illumination light source 31 and the infrared rays L2 outputted from the light source 32 of the infrared rays are incident on the light guide part 60 from the light input surface 61 and the inclined light input surfaces 62 in the lower end part side of the light guide part 60.

Here, the light guide part 60 of the pointer 22 includes the light input surface 61 formed by the lower end surface and the inclined light input surfaces 62 formed by the inclined surfaces at both the sides of the light input surface 61. Further, the plurality of pairs of illumination light sources 31 and the light sources 32 of the infrared rays which are arranged in parallel to each other on the circuit board 1 are provided at prescribed intervals along the rotating track of the light guide part 60 in the periphery of the rotation shaft 34. Accordingly, even when the pointer 22 is rotated and arranged at any angle, the visible rays L1 outputted from the illumination light sources 31 and the infrared rays L2 outputted from the light sources 32 of the infrared rays are assuredly incident on the light guide part 60.

The visible rays L1 and the infrared rays L2 which are incident on the light guide part 60 are totally reflected in the boundaries to the external fields in the outer peripheral surface and the inner peripheral surface of the light guide part 60, propagated upward and reach to the reflection part 38 in an upper end part of the light guide part 60.

The visible rays L1 are reflected on the surface of the reflection part 38 formed with the cold mirror. Most of the visible rays whose advancing optical path is deflected substantially by 90° is gradually absorbed or attenuated and guided to the end of the main body part 23 to emit lights and make an illumination. Thus, the pointer 22 can carry out an indirect light emission.

The infrared rays L2 pass through the reflection part 38 formed with the cold mirror. The infrared rays L2 passing through the reflection part 38 pass through the cap 37, are guided to the diffusion lens 39, diffused from a diffusion surface 39a of the diffusion lens 39 and outputted to an outer part. Thus, the face of a driver is equally irradiated with the infrared rays L2 outputted from the meter device 20B. Accordingly, an orientation of the face or a direction of the line of sight of the driver can be effectively detected by a camera 15 having a detection property which makes it possible to photograph the lights of a wave length of an infrared ray (IR) area.

Further, also in the case of the meter device 20B, since the infrared rays L2 applied to the face of the driver are outputted from a part of the pointer 22 illuminated by the visible rays L1, a fear is suppressed that an uneasiness may be possibly given to the driver by the infrared rays L2.

As described above, according to the meter device 20B of the modified example 2, since the pointer 22 is allowed to emit lights and to be illuminated by the visible rays L1, the visibility of the pointer 22 can be enhanced. Further, since the infrared rays L2 are outputted from the pointer 22, the infrared rays L2 can be applied to the face of the driver to photograph the face of the driver by the camera 15 and the orientation of the face or the direction of the line of sight of the driver can be effectively detected by the camera. At this time, since the applied infrared rays L2 are outputted from a central part of the rotation of the pointer 22 which is illuminated by the visible rays L1, a fear can be more suppressed that an uneasiness may be possibly given to the driver by the infrared rays L2 than in a structure in which the infrared rays are applied from a separately provided light source of the infrared rays. Further, the meter device can be easily installed in a restricted space, so that a degree of freedom in design can be enhanced and a design property can be improved.

Especially, in the modified example 2, the visible rays L1 and the infrared rays L2 from the illumination light sources 31 and the light sources 32 of the infrared rays are made to be incident from the light input surface 61 and the inclined light input surfaces 62 in the base end part side of the light guide part 60 provided in the pointer 22 and can be effectively guided to the reflection part 38 of the pointer 22 through the light guide part 60.

Here, features of the meter device and the meter unit according to the above-described exemplary embodiments are respectively briefly summarized and listed in below-described [1] to [6].

[1] A meter device comprising:
  a rotation shaft (34);
  a pointer (22) provided in an end part of the rotation shaft (34) and rotating integrally with the rotation shaft (34),
  an illumination light source (31) which outputs visible rays (L1) to the pointer (22);
  a light source (32) of infrared rays (L2) which is arranged in parallel to the illumination light source (31) and outputs the infrared rays (L2) to the pointer (22); and a reflection part (38) provided in the pointer (22) to substantially reflect the visible rays (L1) into the pointer (22) and to substantially pass and output the infrared rays (L2) from a central part of rotation of the pointer (22).

[2] The meter device according to the above-described [1],
wherein the illumination light source (31) and the light source (32) of the infrared rays are arranged, opposing to an end face (34a) of a base end part side of the rotation shaft (34), and
wherein the visible rays (L1) and the infrared rays (L2) pass through the rotation shaft (34) and reach the reflection part (38).

[3] The meter device according to the above-described [1],
wherein the meter device further comprises a tubular light guide member (40) into which the rotation shaft (34) is inserted,
wherein the illumination light source (31) and the light source (32) of infrared rays are arranged, opposing to an end face (40a) of a base end part side of the light guide member (40), and
wherein the visible rays (L1) and the infrared rays (L2) pass through the light guide member (40) and reach the reflection part (38).

[4] The meter device according to [1],
wherein the pointer (22) includes a light guide part (60) protruding toward the illumination light source (31) and the light source (32) of infrared rays and having light input surfaces (a light input surface 61, inclined light input surfaces 62) which allow the visible rays (L1) and the infrared rays (L2) to be incident.

[5] The meter device according to any one of the above-described [1] to [4],
wherein a diffusion lens (39) which diffuses and outputs the infrared rays (L2) is provided with the pointer (22).

[6] A meter unit comprising:
the meter device according to any one of the above-described [1] to [5];
a camera (15) which picks up an image of an irradiated member which is irradiated with the infrared rays (L2); and
a meter panel (4) on which the meter device (20, 20A) and the camera (15) are installed.

DESCRIPTION OF REFERENCE NUMERALS AND SIGNS

4 . . . meter panel 10 . . . meter unit 15 . . . camera 20, 20A, 20B . . . meter device 22 . . . pointer 31 . . . illumination light source 32 . . . light source of infrared rays 34 . . . rotation shaft 34a, 34b . . . end face 38 . . . reflection part 39 . . . diffusion lens 39a . . . diffusion surface 40 . . . light guide member 40a, 40b . . . end face 60 . . . light guide part 61 . . . light input surface 62 . . . inclined light input surface (light input surface) L1 . . . visible rays L2 . . . infrared rays

What is claimed is:
1. A meter device comprising:
a rotation shaft;
a pointer provided in an end part of the rotation shaft and rotating integrally with the rotation shaft;
an illumination light source which outputs visible rays to the pointer;
a light source of infrared rays which is arranged in parallel to the illumination light source and outputs the infrared rays to the pointer; and
a reflection part to which the visible rays outputted from the illumination light source and the infrared rays outputted from the light source of infrared rays are simultaneously guided through the rotation shaft and which is provided in the pointer to substantially reflect the visible rays into the pointer and to substantially pass and output the infrared rays from a central part of rotation of the pointer.

2. The meter device according to claim 1,
wherein the illumination light source and the light source of the infrared rays are arranged, opposing to an end face of a base end part side of the rotation shaft.

3. The meter device according to claim 1,
wherein the pointer includes a light guide part protruding toward the illumination light source and the light source of infrared rays and having light input surfaces which allow the visible rays and the infrared rays to be incident.

4. The meter device according to claim 1,
wherein a diffusion lens which diffuses and outputs the infrared rays is provided with the pointer.

5. A meter unit comprising:
the meter device according to claim 1;
a camera which picks up an image of an irradiated member which is irradiated with the infrared rays; and
a meter panel on which the meter device and the camera are installed.

6. A meter device comprising:
a rotation shaft;
a pointer provided in an end part of the rotation shaft and rotating integrally with the rotation shaft;
an illumination light source which outputs visible rays to the pointer;
a light source of infrared rays which is arranged in parallel to the illumination light source and outputs the infrared rays to the pointer; and
a reflection part provided in the pointer to substantially reflect the visible rays into the pointer and to substantially pass and output the infrared rays from a central part of rotation of the pointer; and
a tubular light guide member into which the rotation shaft is inserted,
wherein the illumination light source and the light source of infrared rays are arranged, opposing to an end face of a base end part side of the tubular light guide member, and
wherein the visible rays and the infrared rays pass through the tubular light guide member and reach the reflection part.

* * * * *